United States Patent [19]

Loesch

[11] 4,189,941
[45] Feb. 26, 1980

[54] VANE STRAIGHTENER RETAINER

[75] Inventor: Stanley B. Loesch, Duncan, Okla.

[73] Assignee: Halliburton Company, Duncan, Okla.

[21] Appl. No.: 954,814

[22] Filed: Oct. 26, 1978

Related U.S. Application Data

[63] Continuation-in-part of Ser. No. 856,476, Dec. 1, 1977, Pat. No. 4,122,717.

[51] Int. Cl.² .......................... G01F 1/10; G01F 15/18
[52] U.S. Cl. ............................... 73/231 R; 73/272 R; 138/37
[58] Field of Search .......................... 73/231 R, 272 R; 29/156.8 R; 415/189, 190, 210, 216, 217

[56] References Cited
U.S. PATENT DOCUMENTS

| | | | |
|---|---|---|---|
| 3,301,053 | 1/1967 | Walch, Jr. et al. | 73/231 |
| 3,433,071 | 3/1969 | Homrig | 73/231 |
| 3,733,910 | 5/1973 | Evans et al. | 73/231 |
| 3,898,883 | 8/1975 | Kozak | 73/231 |
| 3,999,885 | 12/1976 | Harris et al. | 73/231 |

*Primary Examiner*—Herbert Goldstein
*Attorney, Agent, or Firm*—James R. Duzan; John H. Tregoning

[57] ABSTRACT

A fluid flow measuring device comprising a hollow cylindrical housing having a plurality of recessed areas extending about a portion of the interior surface of the housing and through only a portion of the thickness of the housing; fluid flow straightening means; means for measuring the flow of fluid through the housing; retaining means having a portion inserted in the recessed area in said hollow housing and having portions substantially conforming to a portion of the exterior surface of said fluid flow straightening means; and fastening means securing said retaining means to said fluid flow straightening means whereby both longitudinal and rotational movement of said fluid flow straightening means in said hollow housing is prevented by said retaining means engaging said hollow housing and substantially conforming to a portion of the exterior surface of said fluid flow straightening means when said retaining means is secured to said fluid flow straightening means by said fastening means. Alternately, the housing may have a continuous recess about the interior surface in place of the plurality of recessed areas.

6 Claims, 7 Drawing Figures

VANE STRAIGHTENER RETAINER

This application is a continuation-in-part of U.S. Patent Application Ser. No. 856,476, filed Dec. 1, 1977 now U.S. Pat. No. 4,122,717.

This invention relates to the construction of a turbine flow meter and more particularly to the retaining means for the flow straightening means in the turbine flow meter.

Typical prior art turbine flow meters are constructed having the turbine rotor disposed in line and between vane type flow straighteners or flow directing elements. A common method of retaining the flow straighteners or flow directing elements in the flow meter housing is to use a snap ring which mates in a groove or channel in the flow meter housing and is interposed between the ends of the flow straightening vanes.

While it is a very convenient retaining method, since the snap ring must protrude into the flow path to mate with the ends of the flow straightening vanes or flow directing elements, the snap ring creates a flow disturbance in the flow path of the flow meter. In turn, the flow disturbance created by the snap ring extending into the flow path of the flow meter affects the accuracy of flow measurement, particularly under high mass flow conditions through the flow meter.

Other common methods of retaining the flow straightening vanes in a flow meter housing include machining a step or slot in the flow meter housing into which the ends of the straightening vanes are received, using a sleeve installed in the flow meter housing to prevent movement of the straightening vanes or using a set screw extending through flow meter housing into the end of a straightening vane. While these are acceptable methods of mounting the straightening vanes within the flow meter housing, they are generally expensive to manufacture, requiring close machining tolerances of the parts, they can result in difficult assembly procedures or in the case of a set screw, they may result in leakage through the flow meter housing.

In contrast to the prior art, the present invention retains the flow straightening vanes without a housing utilizing deformable tabs to secure the ends of the straightening vanes within the housing. By retaining the ends of the straightening vanes in a housing utilizing deformable tabs, the straightening vanes are easily assembled in the housing, close machining tolerances are not required for the parts and little flow path disturbance results from the clips extending into the flow path thereby improving the accuracy of flow measurement of the flow meter.

The foregoing advantages and the preferred embodiments of the invention will be better understood from the foregoing specification taken in conjunction with the accompanying drawings wherein.

Figure 1:
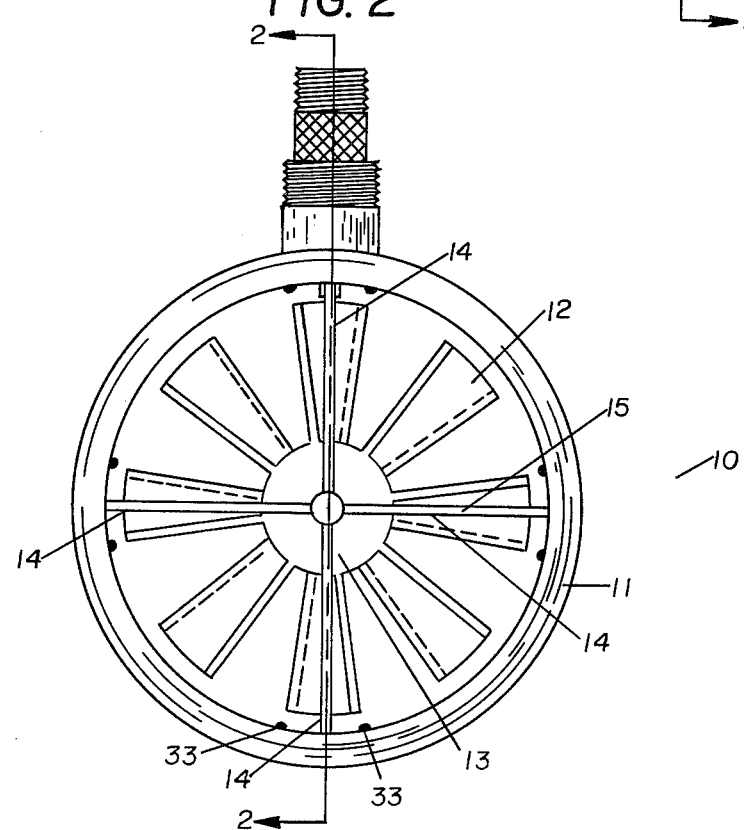
FIG. 1 is a front view of the invention.

Referring to FIG. 1, the invention is shown in its preferred embodiment. A turbine flow meter 10 is shown comprising a hollow cylindrical housing 11, turbine rotor 12 and flow straightening member 13 having straightening vanes 14 thereon. As shown, the flow straightening member 13 is held in position in the housing 11 by retaining means 15 engaging the outer end of a vane 14 and the inner periphery of the housing 11.

As further shown in FIG. 1, beads of weld material 33 are formed on the interior surface of the housing 11 on either side of a vane 14 to prevent the flow straightening means 13 from rotating when installed in the housing 11. Alternatively, a pair of pins (not shown), each pin being positioned in a bore extending at an angle into the housing 11 on either side of a vane 14, may be used to prevent the flow straightening means 13 from rotating when installed in the housing 11.

Figure 2:
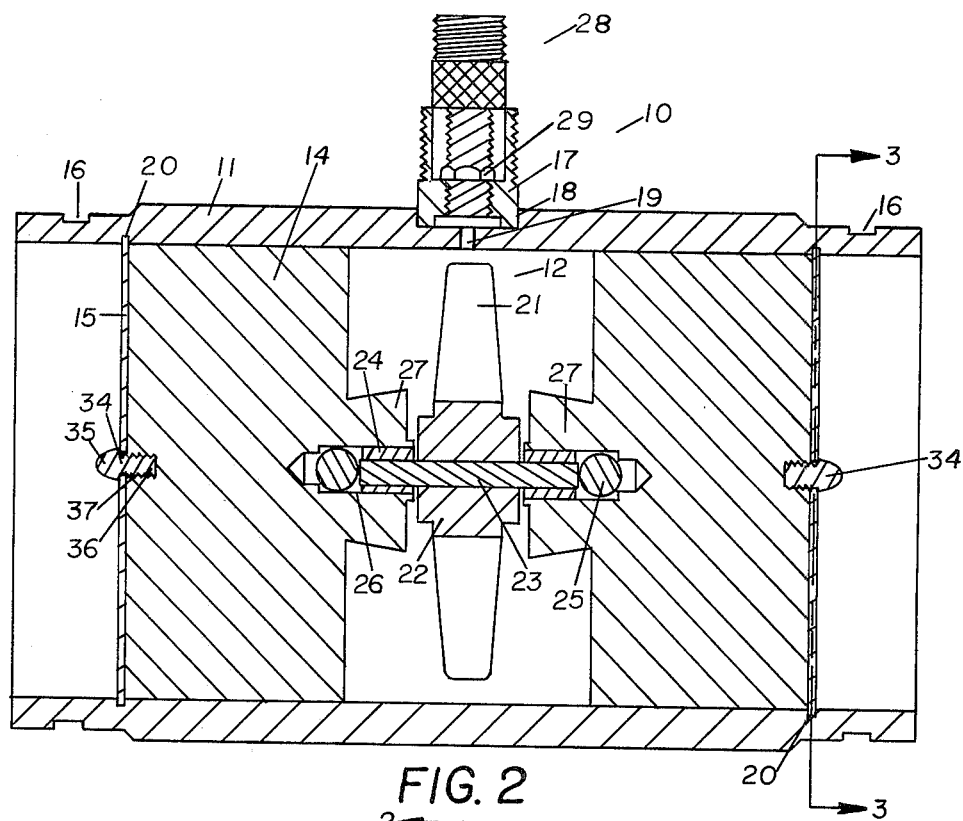
FIG. 2 is a cross-sectional view of the invention taken along line 2—2 of FIG. 1.

Referring to FIG. 2, the turbine flow meter 10 is shown in cross-section. The housing 11 is formed with each end portion having an external groove 16 therein to facilitate connecting the turbine flow meter 10 in a conduit (not shown). Although shown as grooved, alternatively, the end portions of the housing 11 may be flanged, threaded, etc. to allow connection with any type conduit. The housing 11 is also formed with an electrical pickup housing 17 thereon. The electrical pickup housing 11 is secured in a recess 18 in the housing 11 and is in fluid communication with the interior of the housing 11 by means of aperture 19. The pickup housing 17 may be secured to the housing 11 by any suitable means, such as welding or interference fit which requires pressing of the pickup housing 17 into the housing 11. The exterior of the pickup housing 17 may be threaded to mate with any suitable electric connector.

The housing 11 is further formed having either an annular channel 20 or a recess or plurality of recesses 20' therein adjacent each end of the housing 11 about the inner periphery thereof into which a portion of the retaining means 15 extend.

The retaining means 15 is secured to the flow straightening member 13 by means of a threaded fastening means 34 having a conical head portion 35 and a threaded portion 36 engaging a threaded bore 37 in the flow straightening member 13.

Installed in the housing 11 is a turbine rotor 12 having blades 21 and a hub 22. The turbine rotor 12 is supported on a shaft 23 which, in turn, is journaled in the flow straightening means 13. Each end of the shaft 23 rides in a bearing 24 and abuts a ball 25, both of which are installed in a bore 26 in the rotor end 27 of the flow straightening means 13.

As further shown in FIG. 2, an electrical pickup 28 threadedly engages the pickup housing 17 on the housing 11. The pickup 28 is secured from loosening in the pickup housing 17 by means of a suitable locknut 29. Any suitable commercially available electrical pickup which is capable of generating electrical impulses as a blade 21 of the rotor 12 passes by may be used.

Figure 3A:
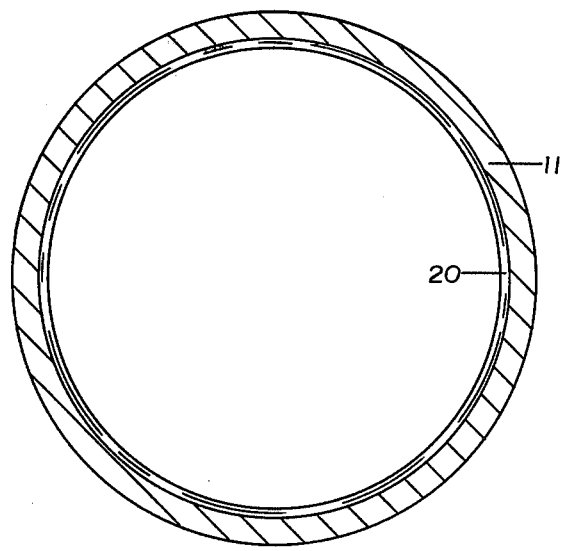
FIG. 3a is a cross-sectional view taken along line 3—3 of FIG. 2 with the flow straightening means and retaining means, not shown, showing only the flow meter housing.

Referring to FIG. 3a, the annular channel 20 is shown in cross-section in the housing 11. As shown, the annular channel 20 extends about the inner periphery of the housing 11 and into which a portion of the ends of retaining means 15 extend.

Figure 3B:
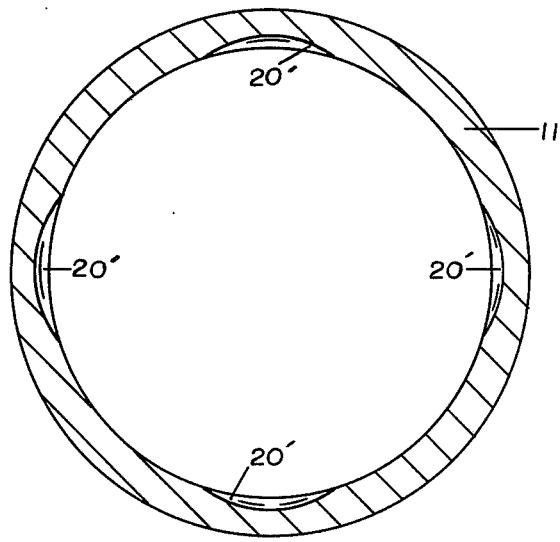
FIG. 3b is an alternative cross-sectional view along line 3—3 of FIG. 2 with the flow straightening means and retaining means, not shown, showing only the flow meter housing.

Referring to FIG. 3b, the housing 11 is shown having a plurality of arcuate recesses 20' located about the inner periphery thereof into which a portion of the ends of retaining means 15 extend. The arcuate recesses 20' about the inner periphery of the housing 11 may vary in number from one to a number equal to the number of vanes 14 on the flow straightening means 13. By utilizing a plurality of arcuate recesses 20' rather than a continuous annular channel 20, when installed, the flow straightening means 13 are precluded from both axial and rotational movement with the housing 11, thereby making the use of beads of weld material 33 or the use of roll pins to preclude the flow straightening means 13 from rotating when installed in the housing 11 optional.

Figure 4:
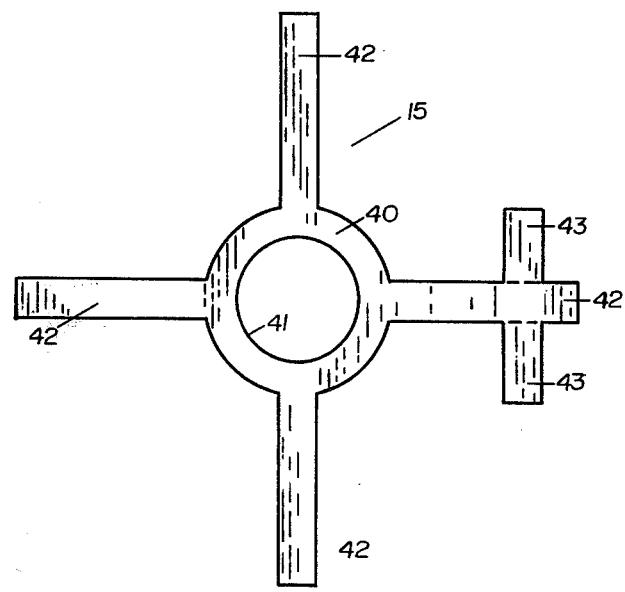
FIG. 4 is a planform view of the retaining means for the flow straightening vanes within the housing.

Referring to FIG. 4, a retaining means 15 is shown in planform. The retaining means 15 comprises a center portion 40 having a bore 41 therein, radial members 42 and deformable tabs 43 formed on the end portion of one or more radial members 42. When installed in the turbine flow meter 10, the ends of the radial members 42 are installed in the annular channel 20 or arcuate recesses 20' in the housing 11 with the radial members 42 being the same width as and overlaying the leading edge of the vanes 14 of the flow straightening member 13. The deformable tabs 43 formed on the end portion of one or more radial members 42, when installed, engage the sides of a vane 14 of the flow straightening means 13 or are deformed to parallel the sides of a vane 14. Since the deformable tabs 43 are either engaging the sides of a vane 14 or paralleling the sides of a vane 14 and since the radial members 42 overlay the leading edges of the vanes 14 of a flow straightening means 13, very little disturbance to the flow through the turbine flow meter 10 occurs, therey improving the accuracy of flow measurement by the turbine flow meter.

When installed, the fastening means 34 has threaded portion 36 inserted through bore 41 of the center portion 40 of the retaining means 15 while conical portion 35 abuts the center portion 40 of the retaining means 15 to secure the same to the flow straightening means 13.

Figure 5:
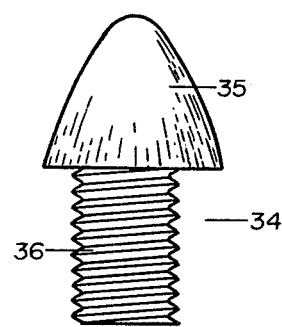
FIG. 5 is a view of the fastening means for the retaining means.

Referring to FIG. 5, the fastening means 34 is shown. The fastening means 34 comprises a conical portion 35 and threaded portion 36. The conical portion 35 is formed such that the diameter of the end abutting the center portion 41 of the retaining means 15 is substantially equal to the diameter of the center portion 41 which, in turn, is substantially equal to the diameter of the nose end 32 of the flow straightening means 13 thereby ensuring a substantially uniform flow surface to eliminate flow disturbances in the flow through the turbine flow meter 10.

Figure 6:
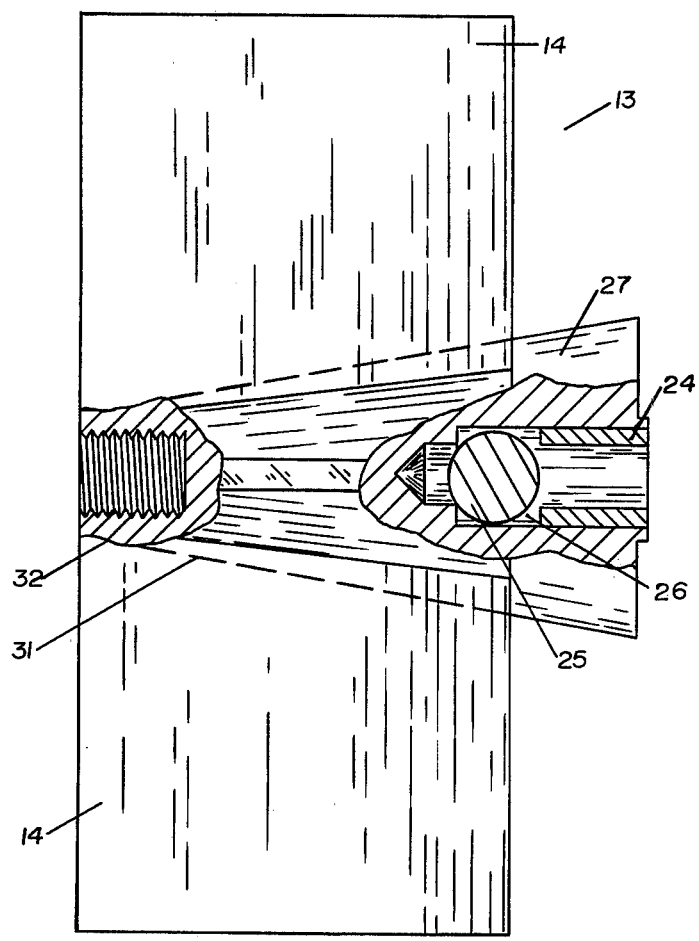
FIG. 6 is a side view of a flow straightening device shown in cross-section in FIG. 2 having the bearing section shown in cross-section.

Referring to FIG. 6, a flow straightening means 13 is shown. Although the central body portion 31 of the flow straightening means 13 has been shown as having the central body portion 31 formed with the rotor end 27 tapering to a reduced diameter nose end 32, the central portion 31 may be any desired shape which is not disruptive to the fluid flow thereover.

To assemble the turbine flow meter 10, a housing 11 has a flow straightening means 13 inserted therein with the leading edge of the vanes 14 located aft of the annular groove 20 or arcuate shaped slots 20'. After insertion of the flow straightening means 13 into the housing 11, a retaining means 15 having deformable tabs 43 deformed with respect to the radial member 42, preferably at a 90° angle thereto, and having each radial member 42 slightly bowed so that the retaining means 13 appears slightly dished, is inserted into the housing 11 with the deformable tabs 43 aligned and abutting within the sides of a vane 14 until the outer ends of the radial members 42 snap into engagement with annual groove 20 or arcuate shaped slots 20' thereby causing the retaining means to be secured to the housing 11. The retaining means 15 is then secured to the flow straightening means 13 by fastening means 34 being inserted through bore 41 of the retaining means 15 with the threaded portion 36 of the fastening means threaddedly engaging threaded bore 32 of the flow straightening means 13 while conical portion 35 of the fastening means 34 abuts central portion 40 of the retaining means 15. When installed, the retaining means 15 prevents the flow straightening means 15 from fore and aft movement in the housing 11 by the outer ends of radial members 42 engaging annular groove 20 in the housing 11 while rotational movement of the flow straightening means 13 with respect to the retaining means 15 is prevented by deformable tabs 43 engaging or paralleling vanes 14 upon relative movement the sides of vane 14 of the flow straightening means 13.

It should be noted that since the retaining means 15 has radial members 42 slightly bowed to insert the retaining means 15 into the housing 11 thereby giving the retaining means 15 a slightly dished appearance, when the retaining means 15 is installed in the housing 11 secured to a flow straightening means 13, fore and aft movement of the flow straightening means 13, due to the annular groove 20 or arcuate shaped slots 20' being slightly greater in width than the thickness of the ends of the radial members 42 of the retaining means 15, is reduced by the spring loading effect of the retaining means 15 against the flow straightening means 13 since the retaining means 15 does not completely return to a flat state after it has been slightly dished for insertion into the housing 11 and after being secured to the flow straightening means 13.

After one flow straightening means 13 has been installed in the housing 11, the rotor 12 is installed in the housing 11 with one end of the rotor shaft 23 inserted into bearing 24 in the rotor end 27 of the flow straightening means 13. At this time, the second flow straightening means 13 is installed in the housing 11 with the other end of the rotor shaft 23 being installed in the bearing 24 of the rotor end 27 of the flow straightening means 13.

As before, at this time the leading edges of the vanes 14 of the flow straightening means 13 are located aft of the annular groove 20 or arcuate shaped slots 20'.

At this point, the rotor 12 and the flow straightening means 13 are separately rotated to establish the orientation of the flow straightening means 13 with respect to the rotor 12 that will cause the least rotational drag on the rotor 12. After the minimum drag orientation for the rotor 12 has been establlished, the retaining means 15 is installed being aligned with the annular groove 20 or plurality of arcuate recesses 20' in the housing 11 by the same procedure used to install the retaining means 15 on the first flow straightening means 13 inserted into the housing 11 thereby securing the second flow straightening means 13 in the housing 11 and retaining the rotor 12 in the housing 11.

Alternatively, the rotor 12 may be assembled with the flow straightening means 13 before the insertion thereof in the housing 11. If this occurs, the method of assembling the turbine flow meter 10 is altered only to the extent that the flow straightening means 13 and rotor 12 are not individually inserted into the housing 11. Although preassembled as a unit before the installation in the housing 11, the flow straightening means 13 and rotor 12 must be aligned and separately rotated to establish the minimum drag configuration for the rotor 12 in the housing 11.

It should be further understood that the electrical pickup 28 may be installed at any time during the turbine flow meter assembly process.

It should also be further understood that although the flow meter assembly procedure has been described with respect to the installation of the retaining means 15 having deformable tabs 43 previously deformed before the assembly of the retaining means 15 in the recess formed by the annular groove 20 or arcuate recess 20' and the slot 30 in the straightening vane 14, the retaining means 15 can be installed in the recess without any prior deformation and subsequently have the deformable tabs 43 deformed into engagement or parallel to the sides of straightening vane 14, although this is a more difficult assembly procedure.

It should be noted that although the invention has been described with respect to installing a flow straightening means 13 in a turbine flow meter 10, the invention can be used to install any type flow straightening means, such as axial straightening vanes or flow directing vanes in any type flow device, such as a rectangular or other cross-sectional shape flow duct. Alternatively, the invention could be used as a support means for any object within a housing in a wide variety of applications with or without fluid flow being encountered.

While the invention has been described with reference to preferred and alternative embodiments, it will be appreciated by those skilled in the art that additions, deletions, modifications and substitutions, or other changes not specifically described may be made which fall within the purview of the appended claims.

What is claimed as new and desired to be secured by Letters Patent is:

1. A fluid flow straightening device comprising:
    a hollow housing having a recessed area extending about a portion of the interior surface of said hollow housing and through only a portion of the thickness of said hollow housing;
        fluid flow straightening means including a central member having bore means therein;
    retaining means having a portion inserted in the recessed area in said hollow housing and having portions substantially conforming to a portion of the exterior surface of said fluid flow straightening means, said retaining means comprising:
        a center portion having an aperture therein; and
        a plurality of radial members secured to the center portion with at least one radial member having deformable tab means thereon substantially conforming to a portion of the exterior surface of said fluid flow straightening means when said retaining means is secured to said fluid flow straightening means;
    fastening means securing said retaining means to said fluid flow straightening means by said fastening means abutting the center portion of said retaining means, passing through the aperture in the center portion of said retaining means and engaging the bore means in the central member of said fluid flow straightening means
    whereby both longitudinal and rotational movement of said fluid flow straightening means in said hollow housing is prevented by said retaining means engaging said hollow housing and substantially conforming to a portion of the exterior surface of said fluid flow straightening means when said retaining means is secured to said fluid flow straightening means by said fastening means.

2. The apparatus of claim 1 wherein said recessed area in said hollow housing comprises an arcuate shaped recess located in an end portion of said hollow housing.

3. The apparatus of claim 1 wherein said fluid flow straightening means further includes:
    a plurality of vanes, each of said vanes having one end attached to the central member and extending radially from the central member while the other end of each of said vanes terminates adjacent said interior surface of said hollow housing.

4. The apparatus of claim 1 wherein:
    said recessed area in said hollow housing comprises an arcuate shaped recess; and
    said fluid flow straightening means further includes a plurality of vanes, each of said vanes having one end attached to the central member and extending radially from the central member while the other end of each of said vanes terminates adjacent said interior surface of said hollow housing.

5. A fluid flow measuring device comprising:
    a hollow housing having a recessed area extending about a portion of the interior surface of said housing and through only a portion of the thickness of said hollow housing;
    fluid flow straightening means including a central member having bore means therein;
    means for measuring the flow of fluid through said housing;
    retaining means having a portion inserted in the recessed area in said hollow housing and having portions substantially conforming to a portion of the exterior surface of said fluid flow straightening means, said retaining means comprising:
        a center portion having an aperture therein; and
        a plurality of radial members secured to the center portion with at least one radial member having deformable tab means thereon substantially conforming to a portion of the exterior surface of said fluid flow straightening means when said retaining means is secured to said fluid flow straightening means;
    fastening means securing said retaining means to said fluid flow straightening means by said fastening means abutting the center portion of said retaining means, passing through the aperture in the center portion of said retaining means and engaging the bore means in the central member of said fluid flow straightening means
    whereby both longitudinal and rotational movement of said fluid flow straightening means in said hollow housing is prevented by said retaining means engaging said hollow housing and substantially conforming to a portion of the exterior surface of said fluid flow straightening means when said retaining means is secured to said fluid flow straightening means by said fastening means.

6. The apparatus of claim 5 wherein:
said recessed area in said hollow housing comprises an arcuate shaped recess;
said fluid flow straightening means further includes a plurality of vanes, each of said vanes having one end attached to the central member and extending radially from the central member while the other end of each of said vanes terminates adjacent said interior surface of said hollow housing; and
said means for measuring the fluid flow through said hollow housing comprises a rotatable ferromagnetic member and an electrical pickup means.

* * * * *